United States Patent [19]

Meier

[11] 4,415,824
[45] Nov. 15, 1983

[54] STATOR CASING FOR AIR-COOLED ELECTRICAL MACHINES

[75] Inventor: Albert Meier, Waltenschwil, Switzerland

[73] Assignee: Zschokke Wartmann AG, Switzerland

[21] Appl. No.: 192,593

[22] PCT Filed: May 1, 1979

[86] PCT No.: PCT/CH79/00063
§ 371 Date: Jan. 3, 1980
§ 102(e) Date: Jan. 2, 1980

[87] PCT Pub. No.: WO79/01024
PCT Pub. Date: Nov. 29, 1979

[30] Foreign Application Priority Data

Jul. 3, 1978 [CH] Switzerland ............... 4860/78

[51] Int. Cl.³ .................................... H02K 5/00
[52] U.S. Cl. ................................ 310/89; 310/42; 310/58; 310/91; 310/254; 29/596
[58] Field of Search .................. 310/89, 91, 52–54, 310/57–59, 64, 65, 60 R, 258, 60 A, 42, 254, 259; 29/596

[56] References Cited

U.S. PATENT DOCUMENTS

| | | | |
|---|---|---|---|
| 1,884,573 | 10/1932 | Chapman | 310/57 |
| 2,761,984 | 9/1956 | Adam | 310/64 |
| 2,795,713 | 6/1957 | Woll | 310/89 UX |
| 3,229,130 | 1/1966 | Drovard | 310/89 UX |
| 3,749,949 | 7/1973 | Muller | 310/59 |
| 3,870,909 | 3/1975 | Pangburn | 310/91 |
| 4,103,192 | 7/1978 | Wendt | 310/91 |
| 4,244,098 | 1/1981 | Barcus | 310/64 |

FOREIGN PATENT DOCUMENTS

| | | | |
|---|---|---|---|
| 388676 | 1/1924 | Fed. Rep. of Germany | 310/57 |
| 1538727 | 4/1965 | Fed. Rep. of Germany | 310/57 |
| 2233860 | 2/1973 | Fed. Rep. of Germany | 310/64 |
| 2226554 | 12/1973 | Fed. Rep. of Germany | 310/57 |
| 2145704 | 2/1973 | France | 310/64 |
| 92809 | 2/1922 | Switzerland | 310/64 |
| 146366 | 7/1931 | Switzerland | 310/89 |
| 337226 | 3/1959 | Switzerland | 310/64 |

*Primary Examiner*—R. Skudy
*Attorney, Agent, or Firm*—McGlew and Tuttle

[57] ABSTRACT

A stator casing for air-cooled machines comprises a sheet metal jacket for mounting on the stator core and having a plurality of shaped-on, axially extending, radially projecting and peripherally spaced cooling ribs. The inner surface of sheet metal jacket is axially convex, the inside edge diameters at both ends of the sheet metal jacket preferably corresponding to the outside diameter of the associated stator core. At both ends, the sheet metal jacket also has reinforcements for preventing the enlargement of the edge diameter on pressing in the stator core. The arrangement is such that upon the pressing operation, the inner surface of the jacket portions of the stator casing located between the cooling ribs are mounted so uniformly and firmly on the stator core over the entire square dimensions thereof that at least from heat and force transfer standpoints, the stator casing and stator cores substantially form a constructional unit.

5 Claims, 9 Drawing Figures

STATOR CASING FOR AIR-COOLED ELECTRICAL MACHINES

FIELD AND BACKGROUND OF THE INVENTION

The present invention relates to a stator casing for air-cooled electrical machines, comprising a sheet metal jacket to be placed on the stator core which has a plurality of shaped-on, axially extending, radially projecting and peripherally spaced cooling ribs.

Such a casing is already known from Swiss Pat. No. 92,809 but in this design it has been found that the sheet metal jacket used therein must be made slightly axially longer than the stator core. The jacket thus extends axially, on either side a casing part in addition to the non-supporting sheet metal jacket, which only serves a cooling function.

With the arrival of new technology in which the cast metal casing parts can be directly replaced by an extended sheet metal cooling rib jacket. The new jacket, however, has to be wholly or partly self-supporting, in addition to exercising its cooling function. Such constructions, for example Swiss Pat. No. 337,226 or West German Offenlegungsschrift No. 2,233,860 are connected by means of complicated and costly welds to the stator core surface in order to obtain the necessary surface termination or dissipation of heat and the transfer of forces.

SUMMARY OF THE INVENTION

The problem to be overcome by the present invention is to again wholly or partly move away from the welding technology and to return to the previously described pressing-in technology, while avoiding the disadvantages thereof and while fulfilling the requirements of having the stator casing being self-supporting and with completely satisfactory and uniform heat transfer over the entire contact surface area between core and casing.

According to the invention, this is achieved in that the inner surface of the sheet metal jacket is made axially convex and the inner edge diameters at both ends of the sheet metal jacket preferably correspond to the outside diameter of the associated stator core and that, at both ends, the sheet metal jacket has reinforcements which prevent an enlargement of the edge diameter when the stator core is pressed into the jacket.

As a result of these measures, it is now possible that with the stator core pressed into the stator casing the inner surface of the jacket parts of the stator casing located between the cooling ribs is uniformly and firmly mounted on the stator core by means of its complete square dimensions that stator casing and stator core substantially form a single unit, in which an optimum heat transfer is ensured and the stator casing completely fulfils the requirement of then being self-supporting.

The convex construction of the stator casing represents an initial stressing which, on pressing in the stator core ensures that the stator casing exerts on the stator core an adequate contact pressure, which is uniformly distributed over the complete square dimensions of contact.

The reinforcements located close to the edges and which prevent an enlargement of the internal edge diameter of the stator casing on pressing in the stator core can be external and/or internal thrust rings, which are connected to the sheet metal jacket in the vicinity of the edge, e.g. by means of welds. These thrust rings can then serve as supports for the bearing brackets of the machine.

However, it is also possible for the reinforcements to be formed by welded joints, close to the edges, on the base of the cooling ribs.

The present invention also relates to a use of the stator casing according to the invention on an air-cooled electrical machine, characterised in that the stator casing is pressed onto the stator core in such a way that the inner surface of the jacket parts located between the cooling ribs is mounted so uniformly and firmly on the stator core by the complete square dimensions thereof that stator casing and stator core, at least from the heat and force transfer standpoints substantially form a constructional unit.

According to a preferred development, an additional, axially extending keyed joint is provided between stator casing and stator core for producing a radial form-locking action.

It is then advantageous if the machine supports are at least partly welded through the stator casings to the stator core.

Exemplified embodiments of the invention are described hereinafter relative to the drawings.

DETAILED DESCRIPTION OF PREFERRED EMBODIMENTS

Figure 1:
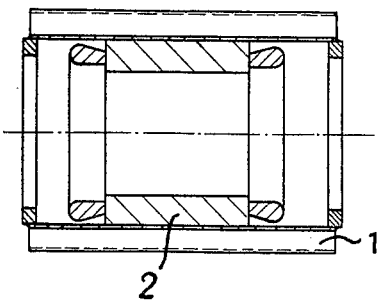
FIG. 1a is a stator casing with a stator in axial section.
FIG. 1b is an exploded view of a stator casing and a stator in axial sections.
Figure 1:
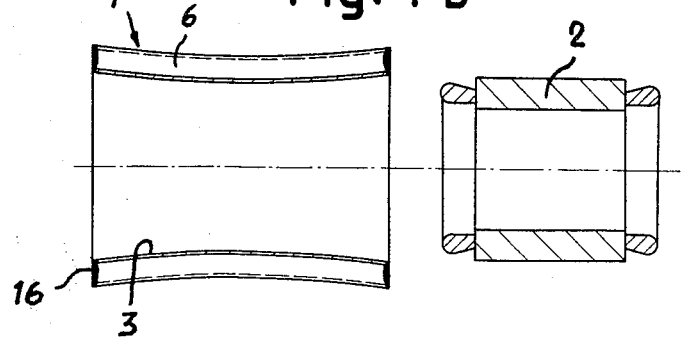
Figure 3:
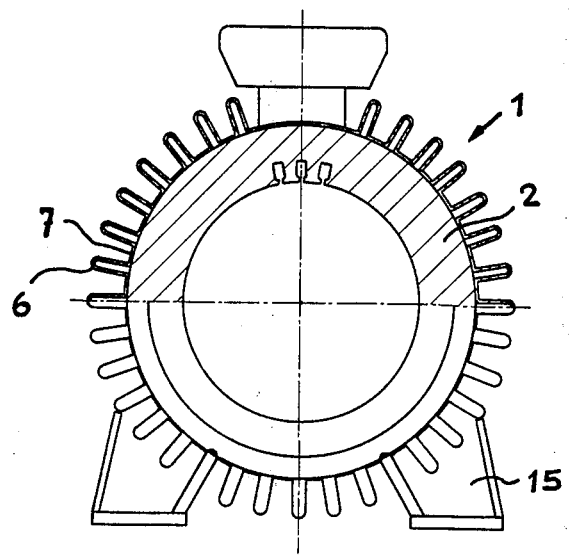
FIGS. 3 and 4 are front views of two different embodiments of stator arrangements of an air-cooled electrical machine.
Figure 4:
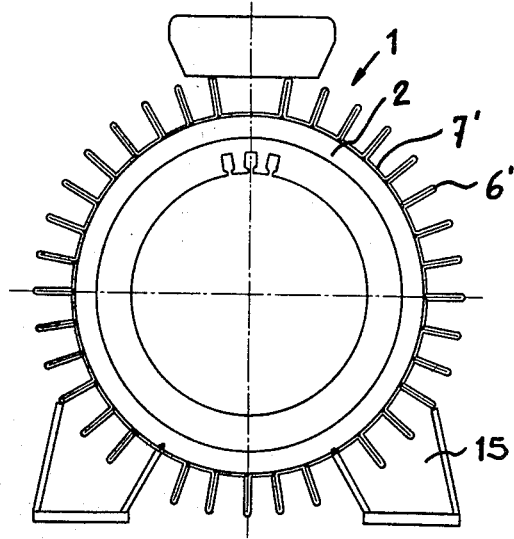

FIGS. 1a and 1b diagrammatically shows an arrangement of a stator casing 1 with a stator core 2 as used for the stator of an inner-cooled electrical machine, for example in accordance with the embodiments illustrated in FIGS. 3 and 4, whereby the stator is supported on the foundation by a support structure 15. It can also be gathered from FIGS. 3 and 4 that the stator casing 1 comprises a sheet metal jacket with a plurality of shaped-on, axially extending radially projecting and peripherally spaced cooling ribs 6, 6' and between the latter are provided jacket parts 7, 7' for engagement on the stator surface in the manner to be described in greater detail hereinafter. The cooling rib 6 can be of the open form (FIG. 3) or the closed form (FIG. 4 at 6'), as is generally known and used.

For the assembly of stator casing 1 as stator core 2, core 2 is pressed into the preshaped stator casing 1 (FIG. 1b). According to the invention, the inner jacket surface of sheet metal jacket 1 is made axially convex while the inside edge diameters at both ends of the jacket 1 correspond to the external diameter of the stator core 2. At both ends, sheet metal jacket 1 is provided with reinforcements, to be described in greater detail hereinafter, which prevent an enlargement of its edge diameter when the stator core 2 is pressed into sheet metal jacket 1. The preshaped stator casing 1 therefore has an initial stressing, so that when core 22 is pressed in, the inner surface of the jacket portion 7 located between the cooling ribs 6, is engaged on the surface of the stator core 2 in an absolutely uniform and firm manner with given contact pressure over the entire square dimensions thereof and as a result, the requirements concerning the heat transfer capacity and torque absorption are fulfilled to a predetermined extent. This technology also permits a disassembly and reassembly between stator casing 1 and stator core 2.

Figure 2:
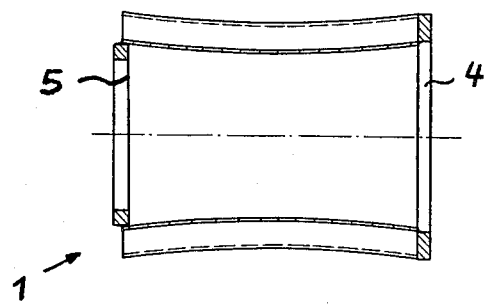
FIG. 2 is a stator casing with thrust rings in axial section.

According to FIG. 1b, the reinforcement can be welding spots 16, close to the edge and on the base or over the entire height of cooling ribs 6. According to FIG. 2, the reinforcement are formed by an outer thrust ring 4 and an inner thrust ring 5 and naturally there can also be either two outer or two inner thrust rings. These thrust rings simultaneously serve as supports for the bearing brackets of the machine (not shown).

Figure 5:
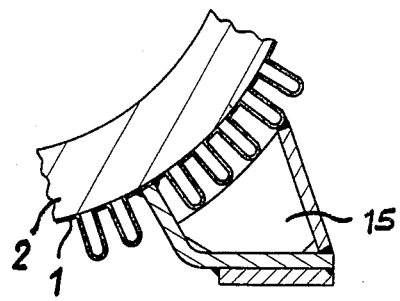
FIG. 5 is a sectional view of a support structure on a stator casing and core arrangement shown in part.

FIG. 5 shows that for fitting the support structure 15 it is advantageous to omit a cooling rib on the periphery of stator casing 1 and to weld the machine support to the stator core, appropriately through the stator casing 1. This naturally only forms one of a large number of possibilities for constructing and fitting support structures.

Figure 6:
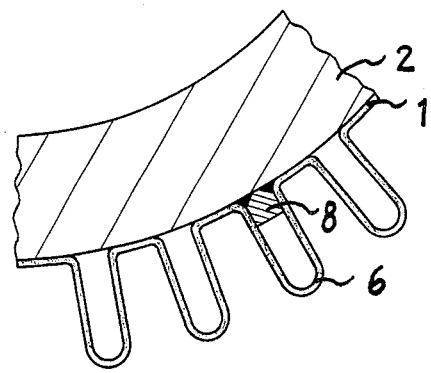
FIGS. 6, 7 and 8 are fragmentary views showing keyed joints between a stator casing and a stator core.
Figure 7:
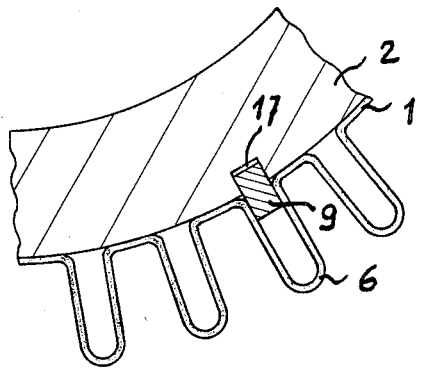
Figure 8:
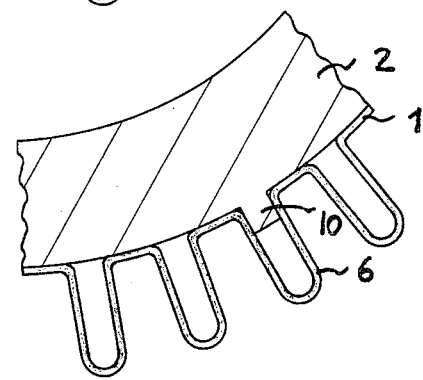

For larger machines, it is often advantageous to provide an additional, axially extending keyed joint between stator casing 1 and stator core 2 for producing radial form locking. FIGS. 6, 7 and 8 show such joints. In the arrangement according to FIG. 6, axially extending flat section bars 8 are distributed over and welded to the periphery of stator core 2. On assembly, said bars engage in the appropriate open cooling rib 6 and can simultaneously serve to hold together the individual laminations of the stator core. This keyed joint is used for axial guidance purposes during assembly and prevents relative displacement between stator casing and stator core. In the arrangement according to FIG. 7, the flat section bars 9 engage both in a corresponding slot 17 in stator core 2 and in a relevant open cooling rib 6 on stator casing 1. Flat section bar 9 can be welded to cooling rib 6. In the arrangement according to FIG. 8, section cams 10 project from stator core 2 and can engage in corresponding hollow cooling rib 6 in stator casing 1.

The above-described stator casing is generally shaped from a metal sheet, the cooling ribs being constructed mechanically by stamping or punching tools. As a result of the appropriate curvature of these tools, it is now possible to produce the above-described convexity of the inner jacket surface in the same operation.

I claim:

1. A stator assembly comprising:
   an initialy axially convex sheet metal jacket having an inside diameter near its center which is initially smaller than an inside diameter near the jacket ends, said jacket formed of a plurality of shaped, axially extending, radially projecting and peripherally spaced cooling ribs;
   reinforcement means at said jacket ends for preventing an enlargement of diameter of said jacket ends; and
   a stator core having an outside diameter substantially the same as said jacket inside diameter at said jacket ends, press-fit into said jacket and against the center of said jacket to move said center radially outwardly so that said stator core is firmly engaged with said jacket and supported thereon;
   said reinforcement means comprising an outer thrust ring and an inner thrust ring connected to each of said jacket ends by welds.

2. A stator assembly according to claim 1, wherein each of said ribs has an axial base adjacent each jacket end.

3. A stator assembly according to claim 1, wherein said outer and inner thrust rings form supports for a bearing bracket for supporting said stator assembly.

4. A stator assembly according to claim 1 wherein said stator core comprises the stator core of an air cooled electric machine, said sheet metal jacket including jacket parts connected between adjacent cooling ribs, said jacket parts uniformly and firmly bearing against an outside diameter of said stator core along the entire area of said jacket parts so that said jacket and stator core comprise a single heat and force transfer constructional unit.

5. A stator assembly according to claim 4, including at least one machine support welded to said stator core, at least partly through said jacket.

* * * * *